United States Patent
Sullivan et al.

(10) Patent No.: US 7,116,871 B2
(45) Date of Patent: Oct. 3, 2006

(54) MANIPULATORS FOR FIBER OPTIC CABLE ASSEMBLIES

(75) Inventors: Mark Timothy Sullivan, Mountain View, CA (US); Carol J Courville, San Jose, CA (US); Paul Zorabedian, Mt View, CA (US); Kerry D Bagwell, Campbell, CA (US); David H. Kittell, Stamford, CT (US)

(73) Assignee: Agilent Technologies, Inc., Loveland, CO (US)

( * ) Notice: Subject to any disclaimer, the term of this patent is extended or adjusted under 35 U.S.C. 154(b) by 18 days.

(21) Appl. No.: 10/913,189

(22) Filed: Aug. 6, 2004
(Under 37 CFR 1.47)

(65) Prior Publication Data
US 2005/0008298 A1    Jan. 13, 2005

Related U.S. Application Data

(62) Division of application No. 09/933,606, filed on Aug. 20, 2001, now Pat. No. 7,009,710.

(51) Int. Cl.
*G02B 6/38* (2006.01)
*G02B 6/06* (2006.01)
*G02B 6/26* (2006.01)

(52) U.S. Cl. ............... 385/52; 385/56; 385/118

(58) Field of Classification Search .............. 385/52, 385/56, 118, 137
See application file for complete search history.

(56) References Cited

U.S. PATENT DOCUMENTS

| | | | |
|---|---|---|---|
| 5,282,393 A | | 2/1994 | Arnone et al. |
| 5,828,566 A | * | 10/1998 | Pryor ........................... 700/59 |
| 6,019,519 A | * | 2/2000 | Grinderslev et al. .......... 385/56 |
| 6,359,741 B1 | * | 3/2002 | Takatsuji et al. ............ 359/827 |
| 6,606,444 B1 | * | 8/2003 | Harman et al. ............. 385/137 |
| 6,701,081 B1 | * | 3/2004 | Dwyer et al. ............... 396/329 |
| 2002/0063864 A1 | * | 5/2002 | Honig ......................... 356/326 |

* cited by examiner

*Primary Examiner*—Sung Pak
*Assistant Examiner*—Tina M Wong
(74) *Attorney, Agent, or Firm*—David Millers

(57) ABSTRACT

A manipulator for a fiber optic cable assembly (FOCA) provides microradian accuracy in control of the direction of a beam emanating from the FOCA. Such manipulators can control FOCAs to control the incidence angles of beams at a beam combiner in a beam-combining unit. Accordingly, fewer additional optical elements are required for control of input paths in the beam-combining unit. The manipulator and the beam-combining unit are accurate enough for use in an interferometer that combines beams with different frequencies and polarizations. One such interferometer includes a Zeeman split laser providing a heterodyne beam. A beam splitter separates frequency components of the beams, and AOMs increase the frequency separation between the separated beams. The separated beams can be sent via optical fibers to the beam-combining unit, which combines the beams for use in interferometer optics.

20 Claims, 5 Drawing Sheets

MANIPULATORS FOR FIBER OPTIC CABLE ASSEMBLIES

CROSS-REFERENCE TO RELATED APPLICATIONS

This patent document is a divisional and claims benefit of the earlier filing date of U.S. patent application Ser. No. 09/933,606, filed Aug. 20, 2001 now U.S. Pat. No. 7,009,710, which is hereby incorporated by reference in its entirety.

BACKGROUND

Combining light beams offers many advantages to optical systems. In particular, beams can be combined to increase overall beam intensity or to construct a composite beam having components with different characteristics. One example of a composite beam is in a two-frequency interferometer that uses a heterodyne beam containing frequency components having orthogonal polarizations. These heterodyne beams can be constructed of two input beams having different frequencies and orthogonal polarizations. Handling each input beam separately before combination permits the individual polarization components to be manipulated to differentiate other characteristics of the component beams.

An optical system can use optical fibers to transmit input beams from one or more source to a beam combiner that combines the input beams into a composite beam. Successful combination of light from optical fibers requires precision control of beams emanating from the optical fibers. One traditional approach for control of the light from an optical fiber is to rigidly mount an optical fiber in a fiber holder so that the optical fiber directs light into a collimator. Light exiting the collimator is parallel and directed along a fixed axis of the collimator. This collimation of the beam from an optical fiber can be achieved with a commercially available manipulator. Such manipulators typically allow translation of the optical fiber in two directions (x and y) to align the optical fiber with the optical axis of the collimator, which may or may not be on a separate manipulator. Alternatively, fiber optic cable assemblies can be purchased with a pre-aligned-collimator termination. This provides collimated output directly from the fiber optic cable assemblies.

The collimated beams from the optical fibers are sent to beam directing optics that direct the collimated light beams into a beam combiner. Opto-mechanical beam manipulators for the beam directing optics control the paths of the light beams entering the beam combiner so that the beams are collinear when exiting the beam combiner.

FIG. 1 illustrates a traditional optical system 100 in which optical fibers 110 and 115 supply light beams from a remote source (not shown). Collimators 120 and 125 make the light exiting respective optical fibers 120 and 125 into parallel beams 130 and 135.

Beam 130 passes through a window 140 and reflects from a mirror 150 before entering a beam combiner 160. The orientation of window 140 controls refraction of beam 130 in window 140 and allows translation of beam 130 in a plane perpendicular to the propagation direction of beam 130. The orientation of mirror 150 controls the direction of beam 130 after reflection from mirror 150. Accordingly, adjustments of the orientations of window 140 and mirror 150 provide four degrees of freedom (i.e., translations along two axes and rotations about two axes) for adjustment of the path of beam 130 into beam combiner 160.

Adjustments of mirrors 145 and 155 similarly provide four degrees of freedom for control of the path of beam 135 into beam combiner 160.

In FIG. 1, beam combiner 160 is beam splitter cube. The portion of beam 130 that passes through beam combiner 160 and the portion of beam 135 that is reflected in beam combiner 160 join to form a combined beam 170. Manipulators that control the orientation of window 140 and mirrors 145, 150, and 155 adjust the paths of beams 130 and 135 so that combiner 160 joins beams into a single collinear combined beam 170.

The approach of FIG. 1 is commonly used because of the availability of good quality, opto-mechanical beam manipulators for optical elements such as mirrors and windows. The disadvantage of the approach is the relatively large number of opto-mechanical components required to precisely position beams 130 and 135 for combination. In particular, system 100 requires two fiber/collimator manipulators for collimators 120 and 125 and four beam manipulators for window 140 and mirrors 145, 150, and 155. Associated with each of these components are their inherent inaccuracies and instabilities. Further, each additional component adds to the overall volume and cost of the beam combination unit.

An alternative approach to handling beams from optical fibers uses a single-mode, fiber optic aligner to adjust and hold the position and angle of a beam from an optical fiber. U.S. Pat. No. 5,282,393 describes an example of a single-mode, fiber optic aligner. Such aligners for two or more optical fibers can produce collimated beams that are directed along the required paths. Shortcomings of these fiber optic aligners are their relatively large size, high cost, and uncertain long-term pointing stability due to the mechanical complexity of these aligners.

SUMMARY

In accordance with an aspect of the invention, a beam-combining unit mounts a collimator for a fiber optic cable assembly on a precision manipulator that controls the direction of the collimated beam. The collimator/manipulator provides two degrees of freedom in control of the path of a light beam and reduces the need for mirrors or windows that perform beam steering. This allows for significant reduction in the number of beam manipulators required when receiving and manipulating beams from optical fibers and reduces the size of a beam-combining unit.

In accordance with another aspect of the invention, a manipulator for mounting of fiber optic cable assembly includes two plates attached by adjustment screws and tangential flexures. The two plates and the flexures can be machined from a single piece of material. Three adjustment screws that are symmetrically positioned around a mounting area for the fiber optic cable assembly control the separation of the plates at three points and thus control the orientation or plane of the plate on which the fiber optic cable assembly is mounted. The adjustment screws can be differential screws to permit microradian accuracy in control of the pitch and yaw of the fiber optic cable assembly.

In accordance with another aspect of the invention, an interferometer uses a two-frequency laser, a beam splitter, and one or more acousto-optic modulators (AOMs) to generate two separate beams having different frequencies. The two-frequency laser provides a heterodyne beam having frequency components with different polarizations that allows the beam splitter to easily separate the frequency components. The AOM(s) can then increase the frequency separation between the separate beams. The resulting beams can be sent via separate optical fibers to a beam combiner unit that recombines the separate beams into a heterodyne beam for use in interferometer optics.

One specific embodiment of the invention is an interferometer that includes a laser, a beam splitter, one or more AOM, and interferometer optics. The laser can use Zeeman splitting to produce a heterodyne beam, and an optical element such as a quarter-wave plate can convert circular polarizations of two frequency components of the heterodyne beam into orthogonal linear polarizations. The beam splitter uses the difference in the linear polarizations to split the heterodyne beam into separate beams having different frequencies, and AOMs in the paths of the separate beams increase the difference between frequencies of the separate beams. Accordingly, the interferometer benefits from the frequency stability of a Zeeman split laser and the enhanced frequency separation that the AOMs provide. Optical fibers carry the separate beams to a beam-combining unit so that heat sources such as the laser are kept away from sensitive interferometer optics.

Another embodiment of the invention is a beam-combining unit for use in the interferometer or in any other optical system. The beam-combining unit includes a beam combiner, an optic cable assembly, and a manipulator. The beam combiner can be a polarizing beams splitter or a birefringent beams splitter that is used in reverse to receive multiple input beams and output a combined beam. The optic cable assembly, which carries a first beam into the beam-combining unit for combination, is mounted on the manipulator. The manipulator is adjustable to control a direction of the first beam upon exit from the first fiber optic cable assembly, and adjustment of the first manipulator controls an incident angle of the first beam on the beam combiner. In particular, the manipulator can direct the beam directly into the beam combiner, through a translating window into the beam combiner, or via fixed optical elements into the beam combiner.

In a typical configuration of this embodiment of the invention, a second fiber optic cable assembly, which carries a second beam into the beam-combining unit, is mounted on a second manipulator. The second manipulator is adjustable to control an incident angle of the second beam on the beam combiner by controlling the direction of the second beam upon exit from the first fiber optic cable assembly.

Yet another embodiment of the invention is a manipulator system that includes a first plate, a second plate, and actuators that control separations of the plates at multiple points, e.g., three points. Each actuator can be a screw engaged in a threaded ball resting in a cavity on the first plate and another threaded ball resting in a cavity on the second plate. The actuators can be manually or automatically operated. Adjustment of the actuators controls orientation of the second plate relative to the first plate, and typically controls pitch and yaw of the second plate and an element such as a fiber optic cable assembly mounted on the second plate.

BRIEF DESCRIPTION OF THE DRAWINGS

Use of the same reference symbols in different figures indicates similar or identical items.

DETAILED DESCRIPTION

In accordance with an aspect of the invention, a two-frequency interferometer uses a laser with Zeeman splitting to generate a heterodyne beam, a polarizing beam splitter to split the heterodyne beam into separate monochromatic beams, and one or more AOMs to increase the frequency difference between the monochromatic beams. Accordingly, the interferometer can have a large frequency difference for measuring fast moving objects and can retain the frequency stability that Zeeman splitting provides. Optical fibers can carry the beams to a beam-combining unit that recombines the monochromatic beams into a combined beam for use in interferometer optics. The use of fiber optics allows the laser and AOMs to be remote from the interferometer optics so that the laser and the AOMs do not affect the thermal environment of the interferometer optics. Sending the separate beams on separate fibers avoids cross-talk between the polarization components.

In accordance with another aspect of the invention, a beam directing opto-mechanical system combines a collimator for an optical fiber with a manipulator that adjusts the direction of the collimated beam emanating from the optical fiber. In a beam directing system controlling input beams to a beam combiner, each collimator/manipulator can be positioned to direct a beam directly into a beam combiner or through a window into the beam combiner. The resulting system has fewer elements, which improves stability and reduces complexity and cost. The beam directing can be applied in a variety of optical systems including but not limited to a two-frequency interferometer.

Figure 2:
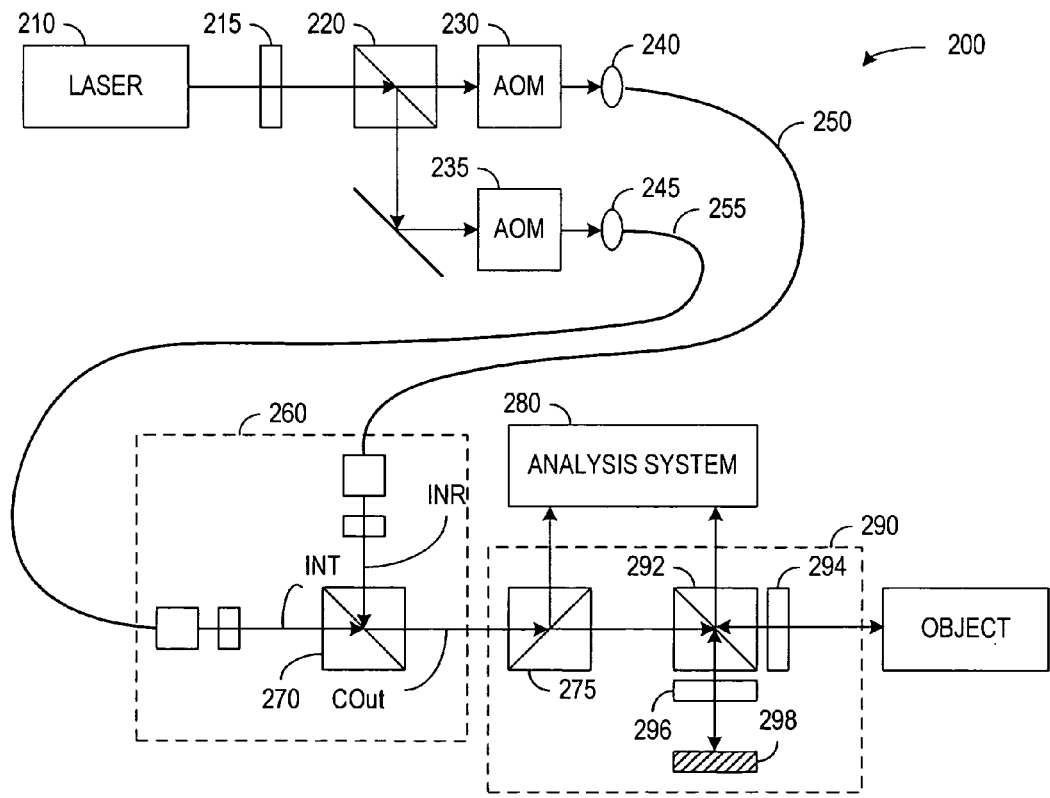
FIG. 2 shows is a block diagram of a two-frequency interferometer in accordance with an embodiment of the invention that uses optical fibers to transmit beams of different frequency and orthogonal polarizations to a beam combiner.

FIG. 2 is a block diagram of an interferometer system 200 in accordance with an embodiment of the present invention. Interferometer system 200 includes a laser 210, a quarter-wave plate 215, a coated polarizing beam splitter 220, acousto-optical modulators (AOMs) 230 and 235, optical fibers 250 and 255, a beam-combining unit 260, and interferometer optics 290.

Laser 210 and quarter-wave plate 215 act as a source of a heterodyne beam having two distinct frequency components with orthogonal linear polarizations. An exemplary embodiment of laser 210 is a commercially available He—Ne laser such as a Model 5517D available form Agilent Technologies, Inc., which uses Zeeman splitting to generate the two frequency components in the same laser cavity. Zeeman splitting in this manner can generate a heterodyne beam having frequency components with frequencies f1' and f2' and a frequency difference f2'−f' of about 2 MHz. The two frequency components have opposite circular polarizations, and quarter-wave plate 215 changes the polarizations of the frequency components so that the frequency components have orthogonal linear polarizations.

Polarizing beam splitter 220 separates the two frequency components. Polarizing beams splitter 220 can be commercially available high quality beams splitter that provides high extinction ratios for one linear polarization in the transmitted beam and the orthogonal linear polarization in the reflected beam. Polarizing beam splitter 220 can be for example a coated polarizing beam that uses a thin-film coating to reflect one linear polarization and reflect an orthogonal linear polarization. Alternatively, polarizing beam splitter 220 can be a birefringent optical element that uses the properties of a birefringent material such as calcite to separate beams having different polarizations.

When using a coated polarizing beam splitter, the extinction ratios can be improved by rotating polarizing beam splitter 220 to a yaw angle that provides the best results and the cleanest separation of the frequency components. Accordingly, the input beam input will generally not be normal to the entrance surfaces of a coated polarizing beam splitter. U.S. patent application Ser. No. 09/933,622, entitled, "Alignment Method For Optimizing Extinction Ratios Of Coated Polarizing Beam Splitters", which is hereby incorporated by reference in its entirety, further describes aligning a coated polarizing beam splitter to maximize performance in separating the two frequency components.

In the illustrated embodiment, the lower frequency component has a polarization that coated PBS 220 transmits to AOM 230, and the higher frequency component has the polarization that coated PBS 220 reflects toward AOM 235. AOMs 230 and 235 operate at different frequencies (e.g., 80 MHz and 86 MHz) and change the frequencies of the two beams to further separate the frequencies of the two beams. The beams output from AOMs 230 and 235 have respective frequencies f1=f1'+80 MHz and f2=f2'+86 MHz that are about 8 MHz apart. The wider frequency separation allows interferometer system 200 to accurately measure faster moving objects.

The embodiment of FIG. 2 uses two AOMs 230 and 235 operating at comparable frequencies (e.g., 80 and 86 MHz). This has the advantage of making the optical paths and influences on the two separate beams more comparable. Additionally, neither AOM needs to operate at a low frequency (e.g., 6 MHz) to increase the frequency difference by a relatively small amount. However, an alternative embodiment of the invention could employ a single AOM to shift the frequency of one of the beams and thereby increase the frequency difference.

Lenses 240 and 245 focus the separate beams into separate polarization preserving optical fibers 250 and 255, respectively. In an exemplary embodiment of the invention, polarization-preserving optical fibers 250 and 255 are commercially available optical fibers such as "Panda" PM fibers available from Corning, Inc. or Fujikura America, Inc. In some applications, optical fibers 250 and 255 may traverse bulkheads or other fixtures. Polarization-preserving fibers 250 and 255 deliver the separate beams to beam-combining unit 260 that directs the two beams into a beam combiner 270.

The use of optical fibers 250 and 255 allows laser 210 and AOMs 230 and 235 to be mounted away from interferometer optics 290. Accordingly, heat generated in laser 210 and AOMs 230 and 235 does not disturb the thermal environment of interferometer optics 290. Additionally, laser 210 and AOMs 230 and 235 do not need to have fixed positions relative to interferometer optics 290, which may provide significant advantages in applications having limited available space near the object being measured.

Beam-combining unit 260 precisely aligns input beams INR and INT from optical fibers 250 and 255 for combination in beam combiner 270 to form a collinear output beam COut. Beam combiner 270 can be a coated PBS that is used in reverse. In an alternative embodiment, beam combiner 270 contains a birefringent material such as calcite. U.S. patent application Ser. No. 09/933,631, entitled "Birefringent Beam Combiners For Polarized Beams In Interferometers", describes beam combiners containing birefringent materials and is hereby incorporated by reference in its entirety.

Combined beam COut is input to interferometer optics 290. In interferometer optics 290, a beam splitter 275 reflects a portion of beam COut to analysis systems 280, and analysis system 280 uses the two frequency components of the light reflected in beam splitter 275 as first and second references beams. The remaining portion of combined beam COut can be expanded in size by a beam expander (not shown) before entering a polarizing beam splitter 292.

Polarizing beam splitter 292 reflects one of the polarizations (i.e., one frequency beam) to form a third reference beam directed toward a reference reflector 298 and transmits the other linear polarization (i.e., the other frequency) as a measurement beam toward an object being measured. In an alternative version of the interferometer optics, a polarizing beam splitter transmits the component that forms the measurement beam and reflects the component that forms the reference beam.

Movement of the object being measured causes a Doppler shift in the frequency of the measurement beam that analysis system 280 measures by combining the measurement beam with the third reference beam to form a beat signal, having a frequency that is equal to the difference between the frequencies of the third reference beam and the measurement beam after reflection from the object. To accurately determine the Doppler frequency shift, the frequency of this beat signal can be compared to the frequency of a reference beat signal generated from a combination of the first and second reference beams. Analysis system 280 analyzes the Doppler frequency shift to determine the speed of and/or distance moved by the object.

Figure 3A:
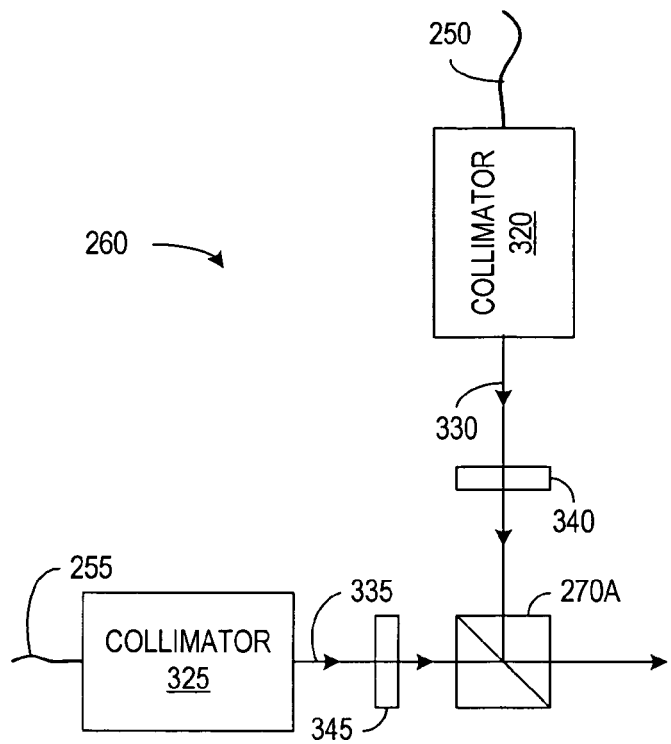
FIGS. 3A and 3B are a block diagram of beam-combining units in accordance with alternative embodiments of the invention.

FIG. 3A is a block diagram of an embodiment of beam-combining unit 260. In this embodiment, beam-combining unit 260 includes a base plate (not shown) two collimators 320 and 325, two microradian manipulators (not shown) for collimators 320 and 325, two parallel windows 340 and 345, two milliradian manipulators (not shown) for windows 340 and 345, beam combiner 270A, and a beam combiner manipulator (not shown).

Optical fibers 250 and 255 are single-mode, polarization-maintaining fibers coupled to respective collimators 320 and 325. The combination of an optical fiber 250 or 255 and a collimator 320 or 325 is sometimes referred to herein as a fiber optic cable assembly (FOCA). Light beams 330 and 335 emanating from respective collimators 320 and 325 are collimated and have linear polarizations.

During an initial adjustment process, collimators 320 and 325 are rotated until the linear polarizations of the two beams emanating from collimators 320 and 325 have the desired directions, which are orthogonal to each other. When the linear polarizations have the desired directions, collimators 320 and 325 are fixed on respective microradian manipulators.

In the illustrated embodiment, all manipulators can be attached to a fixed, stiff base plate. One base plate can accommodate beam combiner units on one side or on opposite sides for systems requiring one, two, or more combined beams. Accordingly, beam combiner units can be stacked for a multiple beam configuration.

The microradian manipulators control the direction of the beams emanating from collimators 320 and 325 to direct the beams onto beam combiner 270 at appropriate incidence angles. Each of the microradian manipulators is capable of pitch, yaw, and piston adjustments, but typically, only pitch and yaw adjustments of collimators 320 and 325 are used. Additionally, each of the microradian manipulators can provide adjustable translation of the beams to avoid the need for windows 340 and 345.

While collimators 320 and 325 are rigidly attached to respective microradian manipulators, optical fibers 250 and 255 trail behind respective collimators 320 and 325. Optical fibers 250 and 255 can be secured with the appropriate slack for strain relief. Accordingly, when a manipulator pitches or yaws, the entire FOCA pitches or yaws, and direction of the beam emanating from the FOCA changes accordingly.

Beam-combining unit 260 uses windows 340 and 345, which are optical quality glass having parallel sides, to translate respective beams 330 and 335. (Such windows are unnecessary in embodiments of the invention were the manipulators for collimators 320 and 325 are capable of translating beams 330 and 335 to the target points.) Each window 340 or 345 is between a corresponding collimator 320 or 325 and beam combiner 270 and is mounted on a milliradian manipulator. Window 340 translates beam 330 horizontally and/or vertically by an amount that depends on the incidence angle of beam 330 on window 340. Similarly, window 345 translates beam 335 horizontally and/or vertically by an amount that depends on the incidence angle of beam 335 on window 345. The milliradian manipulators control the orientation of windows 340 and 345 and thereby control translation of beams 330 and 335 relative to beam combiner 270A.

Figure 1:
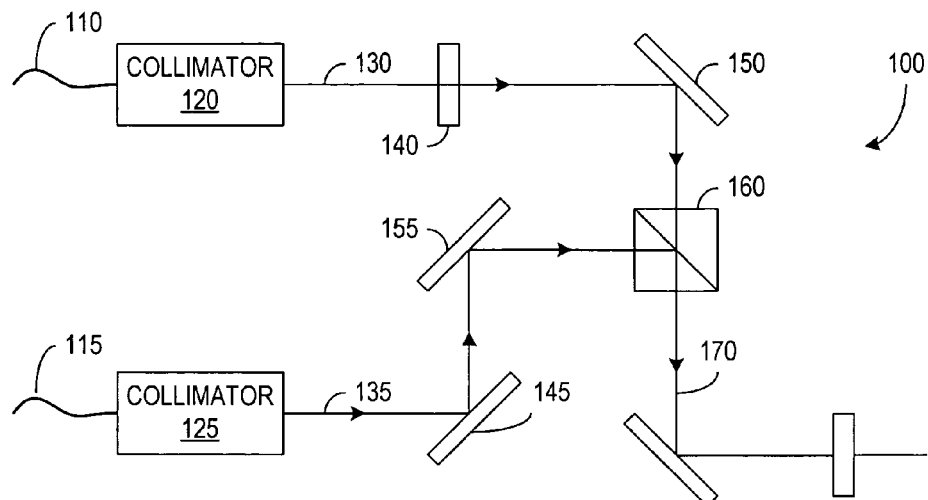
FIG. 1 shows a conventional optical system that directs beams from optical fibers into a beam combiner.

The combination of the manipulator for the collimator 320 or 325 and the manipulator for the window 340 or 345 provides four-degrees of freedom for the adjustments of the path of a beam 330 or 335. While manipulators for collimators 320 and 325 provide microradian resolution, the manipulators for windows 340 and 345 can use a coarser (e.g., milliradian) resolution. This is because the manipulators for collimators 320 and 325 control the directions of the beam, and inaccuracy in the angle can result in the beams increasingly separating with distance from the beam combiner. In contrast, inaccuracy in the translation results in the beams results only in a fixed offset between the centers of the beams. In prior beam combining units such as illustrated in FIG. 1, all of the manipulators that affected the angles of the beams required fine resolution.

Generally, only one window 340 or 345 and associated manipulator is required to translate one of beams 330 or 335. For example, the microradian manipulator of one FOCA can direct a beam 330 or 335 directly onto beam splitter 270A, and the mirror for the other beam 335 or 330 translates the beam so that the output beams from beam combiner 270 are collinear parts of composite beam COut. However with two windows and manipulators, both beams can be translated to a desired point of incidence on beam combiner 270.

Figure 3B:
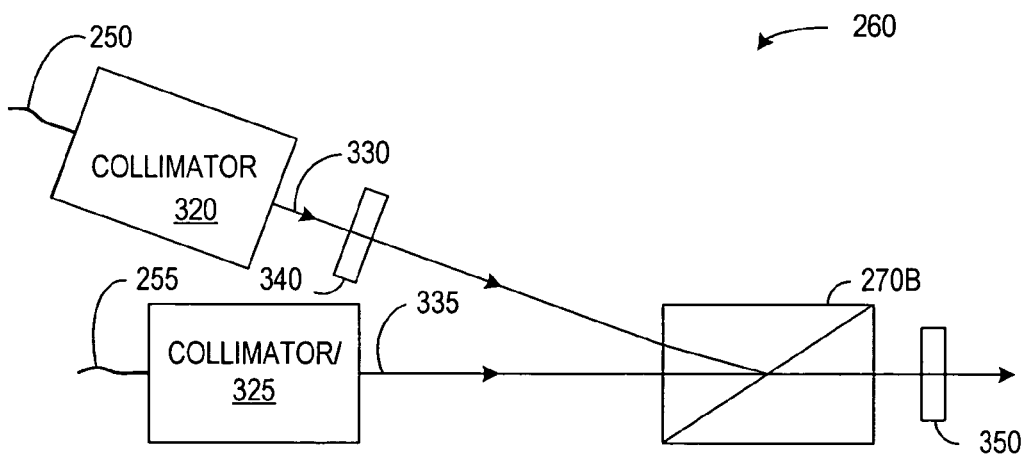

Generally, beam combiner 270 is a beam splitter used in reverse and is of a type chosen according to the requirements of interferometer 200. In the embodiment of FIG. 3A, beam combiner 270A is a polarizing beam splitter, and a manipulator for polarizing beam splitter 270A can adjust the yaw angle of beam combiner 270A for optimal performance. FIG. 3B illustrates an embodiment of the invention in which a beam combiner 270B is a birefringent prism. In particular, beam combiner 270B is a Rochon prism, but various birefringent prisms such as Wollaston, Cotton, or Glan-Thompson prisms may also be employed. Use of such polarization sensitive optical elements helps clean the polarization/frequency purity of combined beam COut because such elements extinguish or separate the undesired polarizations from the composite beam COut.

The embodiment of beam-combining unit 260 shown in FIG. 3B also illustrates use of translation capabilities for only one input beam 330. For this configuration, an alignment process adjusts directions of input beam 330 and 335 with microradian manipulators and then translates beam 330 so that beams 330 and 335 overlap when output beam from beam combiner 270B. Accordingly, the output beam has a position that depends on beam 335, and input beam 335 cannot be translated to a target. However, adjustment of an optional window 350 can translate the output beam to a target location.

Beam-combining units 260 of FIGS. 3A and 3B direct beams 330 and 335 almost directly from collimators 320 and 325 into respective beam combiners 270A and 270B. The size of beam-combining unit 260 thus depends on required distances and angles between the FOCAs and the beam combiners. More compact versions of the beam-combining units illustrated in FIGS. 3A and 3B could include fixed mirrors (e.g., on mounts that have no self-adjustment).

Figure 4A:
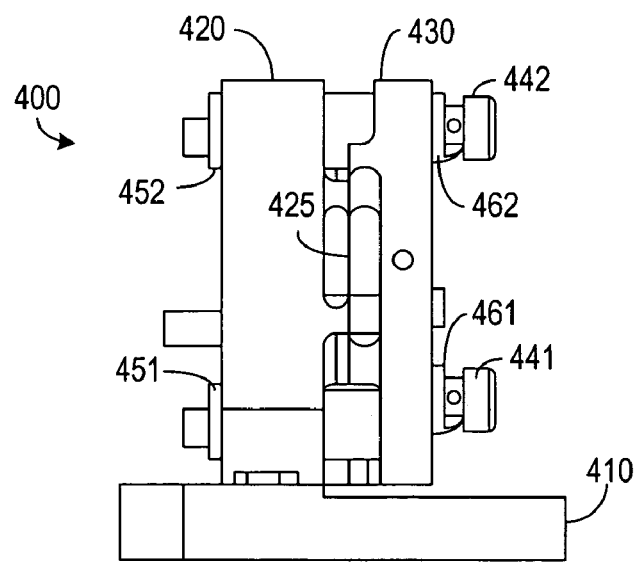
FIGS. 4A, 4B, and 4C show side, front and top views of a manipulator in accordance with an embodiment of the invention that provides microradian control of a fiber optic cable assembly.
Figure 4B:
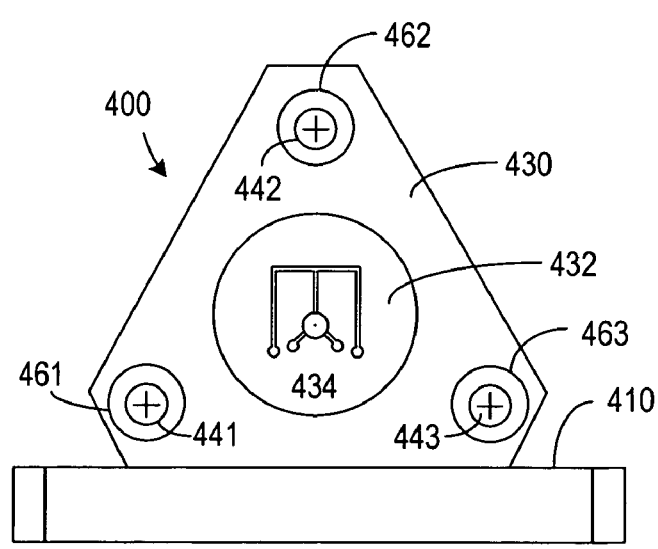
Figure 4C:
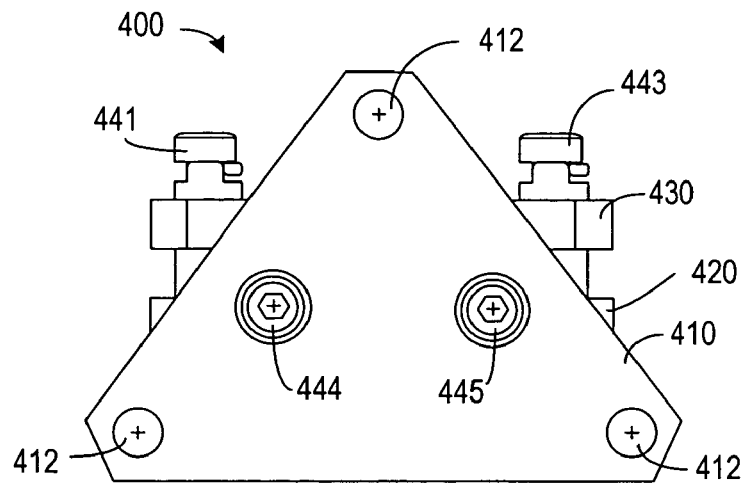

FIGS. 4A, 4B, and 4C are respectively side, front, and bottom views of an embodiment of a microradian manipulator 400 suitable for mounting of a fiber optic cable assembly. Manipulator 400 includes a bottom plate 410, a fixed plate 420, and a pitch/yaw plate 430. As shown in FIG. 4C, bottom plate 410 has three feet 412, which contact the base plate when manipulator 400 is mounted in an optical system. Screws 444 and 445 attach fixed plate 420 to bottom plate 410.

Three tangential flexures 425 and three differential screws 441, 442, and 443 attach pitch/yaw plate 430 to fixed plate 420. Tangential flexures 425, pitch/yaw plate 430, and fixed plate 410 can all be machined from the same piece of material, so that tangential flexures 425, pitch/yaw plate 430, and fixed plate 410 are different portions of the same continuous structure. Flexures 425 are basically S-shaped and thin enough to flex to permit movement that changes the separation between pitch/yaw plate 430 and fixed plate 420. But, flexures 425 keep pitch/yaw plate 430 aligned with fixed plate 420 to prevent rotation of pitch/yaw plate 430 about an axis perpendicular to plates 420 and 430.

FIG. 4B shows a mounting area 432 on pitch/yaw plate 430 for a fiber optic cable assembly (not shown). An opening 434 formed in pitch/yaw plate 430 accommodates the optical cable and can be deformed to clamp the FOCA in place. Alternatively or additionally, a mounting structure for the collimator can hold the FOCA on pitch/yaw plate 430 so that the direction of the collimated beam depends on the orientation of pitch/yaw plate 430.

Adjustments of differential screws 441, 442, and 443 control the orientation of pitch/yaw plate 430 and accordingly control the direction of a collimated beam emanating from the FOCA. In particular, adjustment of differential screw 442 can change the pitch angle of the collimated beam, and opposing adjustments of differential screws 441 and 443 change the yaw angle of the collimated beam.

Each differential screw 441, 442, or 443 is spring-loaded against and threaded into a pair of threaded balls 451 and 461, 452 and 462, or 453 and 463. Threaded balls 451, 452, and 453 sit in respective cones in fixed plate 420, and threaded balls 461, 462, and 463 sit in respective cones in pitch/yaw plate 430. (As shown in FIG. 4A, the term ball is used herein to indicate that a portion of the surface of the device is spherical, not to indicate a full sphere.) Balls 451, 452, and 453 have a thread pitch that differs slightly from the thread pitch of balls 461, 462, and 463, and each differential screw 441, 442, and 443 has one end with a thread pitch matching the thread pitch of balls 451, 452, and 453 and an opposite end with a thread pitch matching the thread pitch of balls 461, 462, and 463. Accordingly, when screws 441, 442, and 443 turn and the associated threaded balls remain stationary, the separation between plates 420 and 430 changes by an amount that depends on the difference in the thread pitches.

Each differential screw 451, 452, or 453 has a fine adjustment mode and a coarse adjustment mode. In the fine adjustment mode, threaded balls 451, 452, 453, 461, 462, and 463 remain stationary so that rotation moves pitch/yaw plate 430 by an amount that depends on the difference in the thread pitches as described above. A pin on the differential screw 441, 442, or 443 and a tang on a ball 461, 462, or 463 provide the coarse adjustment mode. When the pin is turned into contact with the corresponding tang, one threaded ball 461, 462, or 463 turns with the screw 441, 442 or 443 so that the movement of pitch/yaw plate 430 depends on the thread pitch of other threaded ball 451, 452, or 453. In an exemplary embodiment of the invention, the coarse-adjustment mode allows a relatively large angular adjustment range of about +/−5 degrees, and the fine-adjustment mode allows manipulator 400 a resolution of approximately one microradian.

Differential screws 441, 442, and 443 can be driven manually or by actuators. Actuators allow remote adjustment of manipulator 400. In particular, picomotors that retain a fixed orientation when powered off can rotate differential screws 441, 442, and 443 for adjustments and can be turned off after adjustment is complete to avoid heating the system during operation.

For a temperature-varying environment, all components of manipulator 400 should be carefully chosen and properly prepared. In particular, the structure should be monolithic in that plates 410, 420, and 430 are machined from one piece of material. Additionally, manipulator 400 should almost exclusively use a material that has a low linear coefficient of thermal expansion (e.g., Invar). This helps minimize differential movement within manipulator 400 as temperatures change. Joints should accommodate material deformation caused by fasteners being properly torqued. Bottom plate 410 has three feet 412 able to accommodate different rates of thermal expansion. This along with cleanliness at all joint interfaces minimizes the hysteresis problems associated with stick/slip movements.

Manipulator 400 also takes advantage of axial symmetry by positioning differential screws 441, 442, and 443 at 120° intervals around mounting area 432 and symmetrically around the optical axis of a mounted FOCA. Plates 420 and 430 share this symmetry so that temperature changes cause axial expansion that does not change the direction of the light beam emanating from the mounted FOCA.

Figure 4D:
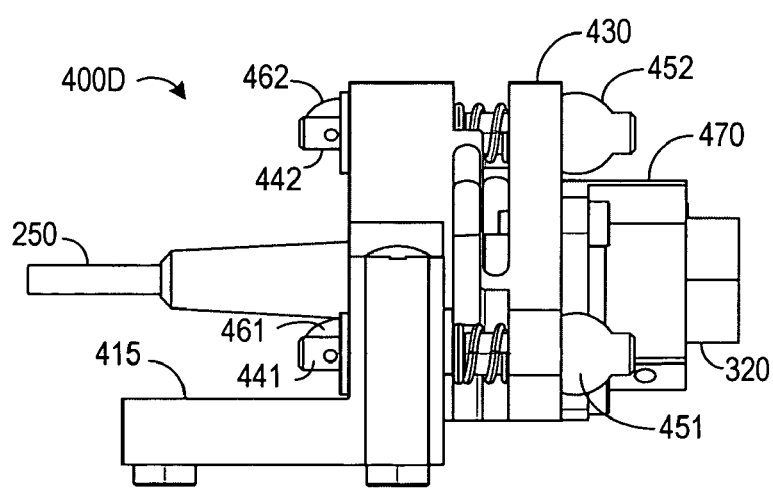
FIG. 4D shows a side view of a manipulator in accordance with another embodiment of the invention.

FIG. 4D shows a side view of a manipulator 400D in accordance with an alternative embodiment of the invention. Manipulator 400D has a single structure 415 that serves both as a bottom plate (e.g., base plate 410), which mounts on a base plate, and as a fixed plate (e.g., fixed plate 420). Additionally, manipulator 400D has a mount 470 that holds a collimator in place.

While the exemplary embodiments of the beam-combining units described above can combine beams to microradian angles and millimeter beam overlap, less sophisticated versions of the invention could be built. In some applications, the required beam overlap is possible to achieve using non-adjustable, mechanical registration, e.g., kinematic mounting, precision fabrication techniques or even standard fabrication techniques. In this simpler case, one collimator would be rigidly mounted so that adequate datum alignment was provided. The second collimator would be mounted in a microradian manipulator such that adequate beam overlap was achieved. Collinearity would be achieved by adjusting the microradian manipulator holding this second collimator. The simplest embodiment would be to rigidly mount the collimators such that the required beam overlap and collinearity were achieved. No translational or rotational adjustment would be used in such an approach. Alignment would be provided by, and limited by the precision of fabrication.

In the general embodiment, the beam combination unit is aligned by first aligning one beam to a datum, e.g., to within specified tolerances, the first beam is aligned to have a specified direction and position relative to a base plate. The second beam is then aligned to be collinear with the first beam. Angle adjustments of the microradian manipulator holding the collimators control the incident angles so that the output beams are highly parallel. Rotating the window in a milliradian manipulator translates one or both beams to maximize the overlap of the beams.

Typically, external detectors measure the alignment of the beams. Position sensitive devices (PDSs) such as a microlens array coupled with a charged coupled device (CCD) array can determine the direction and overlap of the two beams. The beam overlap can also be evaluated using an alignment telescope and CCD camera.

The collinearity and the stability of the combined beam can be evaluated using a precision autocollimator with beam centroiding capability. For this evaluation, the combined beam is directed into an autocollimator equipped with a CCD camera focused at the eyepiece of the autocollimator. With one beam blocked, the autocollimator, a frame grabber, and analysis software determine the centroid or profile of the unblocked (first) beam. With the first beam blocked, the same procedure determines the centroid or profile of the second beam. The autocollimator measures the angle between the beams (i.e., the collinearity of the beams). The autocollimator can be calibrated by observing the same beam with and without a precision optical wedge in the path of the beam. The difference in the two measurements and the known angle of the precision wedge indicate the effect of angular variations.

Another method for evaluating the collinearity and stability of the combined beam involves a series of position sensitive devices (PSDs) mounted to a stable base plate.

For use, the beam combination unit is mounted on a dimensionally stable frame or table. If the beam combination unit is to be pre-aligned, the interface between the unit and the table is critical. In particular, the table must mimic the surface used to pre-align the unit. Otherwise, the critical alignment of the two beams may be affected. One way to ensure interface consistency is to employ a kinematic coupling between the unit and the table.

The alignment of the beams could also be measured using detectors internal to the beam combination unit. As with the use of external detectors, built-in detectors provide an operator with alignment information during adjustments of the microradian manipulators. The detectors could also be configured to work in an active alignment system where the detectors generate an error signal and instruct actuators to move the manipulators appropriately (i.e., closed-loop control).

Figure 5:
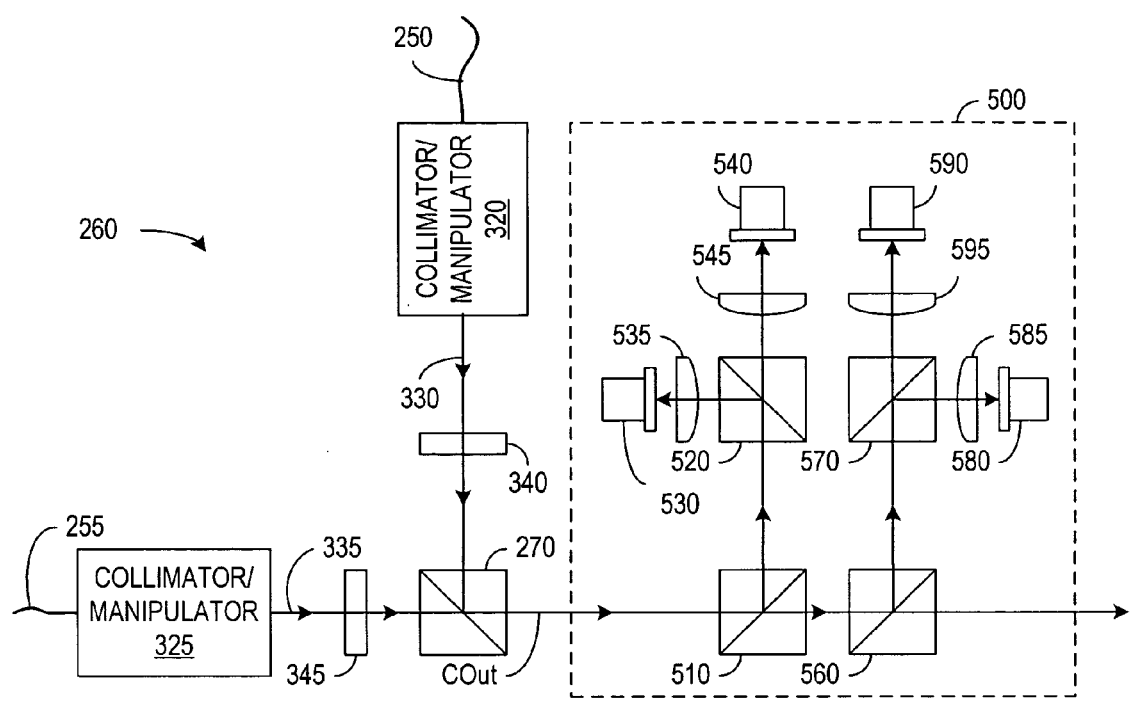
FIG. 5 is a block diagram of a beam-combining unit including an active adjustment unit in accordance with an embodiment of the invention.

FIG. 5 shows a beam-combining unit 260 that includes the structures described above in regard to FIG. 3A and additionally includes an active alignment system 500. In this example, beam 330 has s-polarization, and beam 335 has p-polarization. After the combined beam COut leaves beam combiner 270, beam splitters 510 and 560 sample combined beam COut at different points along the beam's path. Beam samples from beam splitters 510 and 560 respectively go to polarizing beam splitters 520 and 570. Polarizing beam splitter 520 splits the s and p polarizations and sends the s and p polarizations through lenses 535 and 545 to detectors 530 and 540, respectively. Polarizing beam splitter 570 splits the s and p polarizations and sends the s and p polarizations through lenses 585 and 595 to detectors 580 and 590, respectively.

The output of detectors 530 and 580 indicates the direction and location of the s-polarization beam, and the output of detectors 540 and 590 indicates the direction and location of the p-polarization beam. By subtracting the output from one set of detectors (e.g., 530 and 580) from the output from the other set of detectors (e.g., 540 and 590), an error signal can be generated to indicate a difference between the paths of the s and p polarization components. The resolution of the error signal in detecting an angular difference between the component beams increases as the distance between detectors increases. The error signal is fed back to actuators that operate the microradian manipulators for one or more of the collimators to eliminate the detected path difference.

Although the invention has been described with reference to particular embodiments, the description is only an example of the invention's application and should not be taken as a limitation. For example, although a manipulator is described in the context of a beam combiner, the manipulators can be used more generally in any system, particularly those requiring precise pitch and yaw control. Similarly, although beam combiners are described in the context of a two-frequency interferometer, embodiments of the beam combiners disclose herein can be applied in any system where combination of two or more beams is sought. Various other adaptations and combinations of features of the embodiments disclosed are within the scope of the invention as defined by the following claims.

We claim:

1. A manipulator system comprising:
   a first plate;
   a first set of threaded devices, each having a spherical surface residing in a cavity on the first plate;
   a second plate having a mounting area for an element being manipulated;
   a second set of threaded devices, each having a spherical surface residing in a cavity on the second plate; and
   a set of screws that attach the second plate to the first plate, each screw having first threaded portion engaged in one of the threaded devices in the first set and a second threaded portion engaged in one of the threaded devices in the second set.

2. The system of claim 1, wherein the first plate is fixed, and adjustment of the screws controls orientation of the second plate and an element mounted on the second plate.

3. The system of claim 2, wherein the set of screws consists of three screws that are positioned to control pitch and yaw of the second plate.

4. The system of claim 1, further comprising a fiber optic cable assembly attached to the mounting area of the second plate.

5. The system of claim 4, wherein the fiber optic assembly comprises:
   a collimator; and
   an optical fiber attached to the collimator.

6. The system of claim 1, wherein for each of the screws, the first threaded portion has a first pitch that differs from a second pitch of the second threaded portion.

7. The system of claim 6, wherein each of the screws comprises a tang that after an initial rotation of the screw engages one of the first and second threaded devices so that that one of the first and second threaded devices rotates as the screw is further rotated.

8. The system of claim 1, wherein each of the threaded devices contacts a corresponding one of the cavities in a manner that permits the threaded device to rotate and change an angle between the plate contacted and the screw engaged in the threaded device.

9. The system of claim 1, further comprising flexures that attach the first and second plates to prevent rotation of the first plate relative to the second plate, the flexures flexing to permit changes in separation between the first and second plates.

10. The system of claim 9, wherein the system comprises a single piece of material forming a continuous structure that includes the first and second plates and the flexures.

11. A manipulator system comprising:
    a first plate;
    a second plate;
    flexures that attach the first and second plate to prevent rotation of the first plate relative to the second plate, the flexures flexing to permit changes in separation between the first and second plates; and
    actuators that attach the second plate to the first plate, the actuators being adjustable to control pitch and yaw of the second plate relative to the first plate, wherein the actuators comprise automated devices operable to change separations between the first and second plates in response to a signal.

12. The system of claim 11, further comprising a fiber optic cable assembly attached to a mounting area on the second plate.

13. The system of claim 12, wherein the actuators comprise three actuators symmetrically located around the fiber optic cable.

14. The system of claim 11, wherein the system comprises a single piece of material forming a continuous structure that includes the first and second plates and the flexures.

15. A manipulator system comprising:
    a first plate;
    a second plate;
    flexures that attach the first and second plates to prevent rotation of the first plate relative to the second plate, the flexures flexing to permit changes in separation between the first and second plates; and
    screws that engage threaded balls in contact with the first and second plates, the screws being independently operable to change separations at multiple points between the first and second plates to control pitch and yaw of the second plate relative to the first plate.

16. The system of claim 15, wherein the screws are differential screws having a first thread pitch engage with the threaded balls in contact with the first plate and a second thread pitch engage with the threaded balls in contact with the second plate.

17. The system of claim 15, wherein the screws are manually operable.

18. The system of claim 16, wherein each of the screws comprises a tang that after an initial rotation of the screw engages one of the threaded balls so that that one of the threaded balls rotates as the screw is further rotated.

19. The system of claim 15, wherein each of the threaded balls contacts one of the first and second plates in a matching cavity that permits the ball to rotate and change an angle between the plate contacted and the screw engaged in the threaded ball.

20. The system of claim 15, wherein the system comprises a single piece of material forming a continuous structure that includes the first and second plates and the flexures.

* * * * *